United States Patent [19]

Scudner, Jr.

[11] 3,898,533
[45] Aug. 5, 1975

[54] FAIL-SAFE SURGE PROTECTIVE DEVICE

[75] Inventor: Frank George Scudner, Jr., Bethlehem, Pa.

[73] Assignee: Bell Telephone Laboratories, Incorporated, Murray Hill, N.J.

[22] Filed: Mar. 11, 1974

[21] Appl. No.: 449,969

[52] U.S. Cl. .................. 317/61; 317/61.5; 317/62; 317/67; 313/204; 313/217; 313/214
[51] Int. Cl.² ...................... H02H 1/04; H02H 3/22
[58] Field of Search .......... 317/61, 61.5, 62, 69, 70; 313/217, DIG. 5, 203, 204, 214, 218, 243; 315/36

[56] References Cited
UNITED STATES PATENTS

| | | | |
|---|---|---|---|
| 2,290,526 | 7/1942 | Berkey et al. | 313/217 |
| 2,365,518 | 12/1944 | Berkey et al. | 313/217 |
| 3,366,825 | 1/1968 | Lafferty | 313/217 |
| 3,454,811 | 7/1969 | Scudner, Jr. | 317/62 |
| 3,651,440 | 3/1972 | Bahr | 317/61 X |
| 3,702,952 | 11/1972 | Cassidy et al. | 313/217 |
| 3,703,665 | 11/1972 | Yereance et al. | 317/61 |

*Primary Examiner*—J. D. Miller
*Assistant Examiner*—Patrick R. Salce
*Attorney, Agent, or Firm*—A. D. Hooper

[57] ABSTRACT

A fail-safe surge protective device includes a housing with electrodes in opposite ends thereof in spaced relation to each other to form a gap. At least one electrode includes a central or discharge portion and an outer or spacing control portion separated therefrom by a groove. The outer portion may include beveled edges. An insulative spacer is disposed between the opposing outer portions of the electrodes and extends outward therefrom to confine discharges to the central portion of the electrodes. The spacer allows the gap spacing between the central portions to be controlled very accurately so that a gap spacing of 3 mils or less to provide a fail-safe protective device can be utilized. The central portions include a coating of carbon thereon. The device can be used either as a gas tube or an air gap protector.

4 Claims, 5 Drawing Figures

PATENTED AUG 5 1975　　3,898,533

FAIL-SAFE SURGE PROTECTIVE DEVICE

BACKGROUND OF THE INVENTION

1. Field of the Invention

This invention relates to voltage surge or overload protective devices, and more particularly to a fail-safe surge protector.

2. Description of the Prior Art

A voltage surge protective device or surge voltage protector is commonly connected between a transmission line and ground. It limits the voltage, which subsequently appears across the line, to protect the line as well as associated vulnerable electronic equipment from electrical stress or overload damage such as might be caused by lightning or other induced overvoltage transients. The central office and subscriber equipment of a telephone system are typical of the apparatus which is so protected.

Overvoltage protection is usually provided by carbon blocks, gas tubes, or a combination of these. Carbon blocks provide low initial cost, fail-safe protection but because of their relatively short operational life and the consequent need for replacement, gas tube protectors with their relatively long life have been used in many applications.

A gas tube surge voltage protector is a twostate device which is essentially nonconductive at its normal line voltage but conductive when a voltage transient causes the enclosed gas to ionize. The general requirements of such a protector include the ability: (1) to withstand normal voltages appearing on the transmission line without breaking down; (2) to limit the surge voltage appearing at the terminals of vulnerable equipment to safe values; (3) to revert to a nonconducting state in the presence of normal line voltages following the conduction of a transient; and (4) to conduct many short-duration pulses, moderate current pulses, and occasional short duration, large current pulses.

Gas tube, voltage surge protectors generally comprise a tubular ceramic or glass housing closed at each end by a metal electrode to form a hermetically sealed discharge chamber for enclosing an ionizable gas mixture. There is an internal gap between the electrodes, and one of the electrodes is typically connected to the transmission line while the other is connected to ground. When a surge of abnormally high voltage appears on the line, the gas tube breaks down via gas ionization processes and conducts with an abrupt increase in current from one electrode across the gap through the device to the other electrode and ground. The device, thereby limits the voltage which appears across itself, and therefore the equipment with which it is connected in parallel, to safe values.

Existing gas tube protectors have relatively large spacings between electrodes such as 15 to 20 mils and greater. Such large spacings provide the proper operating characteristics in the particular gas environment within the protectors, i.e., the protectors break down at voltage levels under the maximum permitted voltage level. However, in the event of a leak in the housing which allows air to displace the desired gas within the protector, the relatively large electrode spacing causes the breakdown voltage level of the protector to increase greatly to a value which may substantially exceed the maximum permitted voltage level. This is known as a "fail open" condition in that the protector remains on open circuit at all voltages below the maximum permitted voltage. Such protectors clearly cannot be used as low breakdown voltage air gap protectors. Accordingly, in applications where a high degree of safety is required, carbon block protectors are placed in parallel with the gas tube protectors to provide backup protection if the gas tube fails open. The gas tube provides the required ground path for a large number of occasions in normal operation whereas the carbon blocks provide the backup ground path for a limited number of occasions if the gas tube fails. This use of two different types of protective devices connected in parallel of course increases the costs of providing protection.

There are some presently known "fail-safe" or "fail-short" gas tube protectors. These protectors that utilize short circuit mechanisms in parallel with the gas tube which are thermally actuated by a sustained overvoltage condition through the protectors are relatively complex and do not always operate satisfactorily. Thus a need remains for a fail-safe surge protective device which requires no backup or parallel protector mechanism.

Accordingly, it is an object of the invention to improve surge protectors.

Another object is to provide a surge protective device which gives fail-safe surge voltage protection without the need for backup or parallel protector mechanism.

Another object is to provide a fail-safe surge protective devices which can be used either as a gas tube protector or as an air gap protector.

SUMMARY OF THE INVENTION

The foregoing objects and others are achieved in accordance with this invention by a protective device using electrodes having a spacing much less than prior art gas tube protectors. The electrode spacing is chosen so that the device can provide the same basic protection as carbon blocks when used as an air gap protector. Thus if the device suffers damage when it is being used as a gas tube protector so that the gas therein is displaced by air, the device merely functions as an air gap protector still having a breakdown voltage less than the maximum permitted voltage on the protected equipment. The electrodes advantageously are coated with carbon to reduce damage or pitting of the electrode faces from discharges therebetween and thereby increase the life of the protector.

The very close electrode spacing is controlled by an insulating spacer such as a mica washer between spacing control surfaces around the periphery of the mating electrode faces. The spacer extends outward from the electrode faces to confine discharges between the electrodes to desired portions thereof away from the spacer. The isolation of the spacer from the discharge path is enhanced by a special electrode face contour.

BRIEF DESCRIPTION OF THE DRAWING

The invention will be more fully comprehended from the following detailed description and accompanying drawing in which.

DETAILED DESCRIPTION

Figure 1:
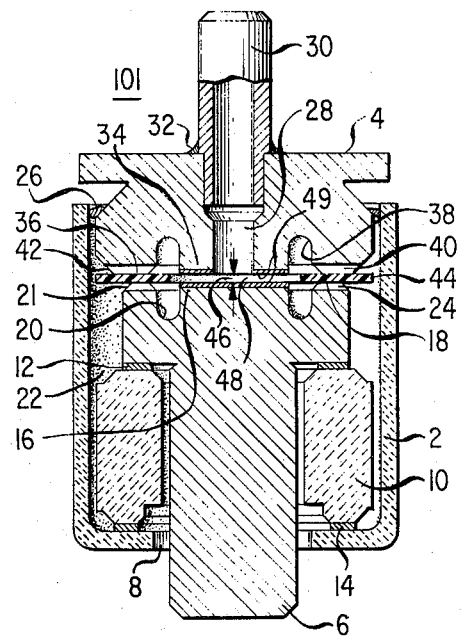
FIG. 1 is a cross-sectional view of one embodiment of the invention.

FIG. 1 discloses a protector or protective device 101 in accordance with the invention comprising a generally cup-shaped housing 2 having its open end closed by an electrode 4 and having a second electrode 6 extending from an opening or hole 8 in the other end thereof. Housing 2 can comprise a metal, ceramic, glass, plastic or similar material.

Electrode 6 is supported by and sealed to a ceramic spacer or similar mount 10 of insulating material by solder joint 12. Spacer 10 in turn is sealably connected to housing 2 by solder joint 14 so that electrode 6 is substantially centered in hole 8 and spaced from the edges thereof. Spacer 10 can be metallized at the locations of joints 12 and 14 as is known in the art to facilitate the formation of these joints.

Electrode 6 includes a discharge or central face portion 16 which is separated from an annular coplanar outer face portion or control portion 18 by a circular groove or depression 20. Outer face portion 18 includes beveled or tapered edges 21 for purposes to be explained subsequently. Electrode 6 is spaced from the inner surface of housing 2 to form a gas chamber 22 which advantageously is connected to groove 20 by slots 24 in portion 18.

Electrode 4 is mounted and sealed in housing 2 by a solder joint 26. Electrode 4 includes a central opening 28 therethrough in which a tubulation 30 is mounted and sealed by solder joint 32 for filling protector 101 with an appropriate gas as is well known in the art when device 101 is used as a gas tube protector.

Electrode 4 includes a central face portion or discharge portion 34, an annular coplanar outer face portion or spacing control portion 36 and a separating groove 38 located in opposing relationship to the central face portion 16, outer face portion 18 and groove 20, respectively, in electrode 6. Outer face portion 36 can also include slots 40 connecting groove 38 with chamber 22. In addition to providing gas flow between groove 38 and chamber 22, slots 40 can also be used to control the interelectrode capacitance. Outer face portion 36 includes tapered, beveled, or similarly recessed edges 42 similar to edges 21 on electrode 6.

An annular spacer 44 of insulative material is located between outer face portions 18 and 36 and establishes the spacing 46 between the central face portions 16 and 34, respectively, of electrodes 6 and 4. Spacer 44 can be made of mica, glass, ceramic, plastic or a similar material. Spacer 44 extends substantially beyond beveled edges 21 and 42 into the cavity formed by grooves 20 and 38 and into chamber 22. The extension of spacer 44 in this manner and the use of beveled edges 21 and 42 greatly increases the breakdown path length between outer face portions 18 and 36. This prevents the gas tube from breaking down between the control or outer face portions 18 and 36 around spacer 44 but instead forces the breakdown to occur between discharge or central face portions 16 and 34. Thus spacer 44 will not be damaged by any normal breakdown and the spacing between the electrodes can be maintained more accurately because of the positive control thereof by spacer 44.

After assembly and processing of devices 101 which are to be used as gas tube protectors, an appropriate ionizable gas such as argon, nitrogen, hydrogen or combinations of these, is admitted through tubulation 30 to fill cavity 48, grooves 20 and 38 and chamber 22 at any desired pressure. Tubulation 30 is then sealed by well known techniques. Alternatively, protector 101 can be assembled in a controlled environment such as a bell jar filled with an appropriate gas such as argon. In such a case tubulation 30 is not needed and electrode 4 can be made without opening 28 therein. Of course, if device 101 is to be used as an air protector, no ionizable gas is utilized and device 101 need not be sealed to the atmosphere.

Figure 2:
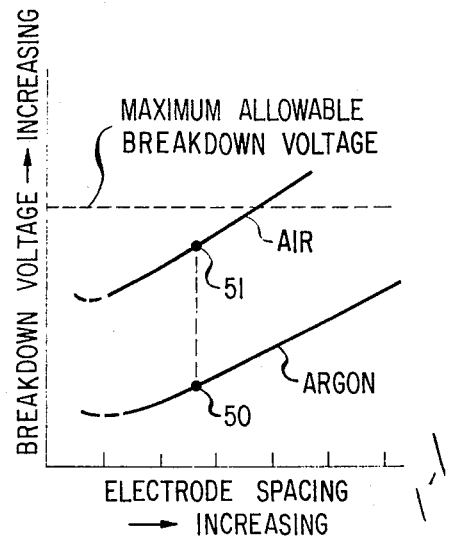
FIG. 2 is a graphical representation of the operation of the surge protector of this invention.

As previously indicated, the spacing 46 between central face portions 34 and 16 in applicant's invention is substantially less than spacings heretofore utilized in gas tube protectors. Applicant has determined that a spacing 46 no greater than approximately 3 mils can be used to provide a fail-safe device which can be used as either a gas tube protector or as an air gap protector for most applications. That is, if device 101 is used as a gas tube protector, it still breaks down below the maximum allowable voltage even if a leak should occur therein which causes a loss of the gas and conversion of the device into an air gap protector. FIG. 2 illustrates the change in breakdown voltage which occurs as the normal gas filling in a gas tube protector is displaced by air. For example, at the desired operating point 50, a gas tube protector with an argon gas fill might break down at 300 volts. If the argon leaks out and is replaced by air, i.e., the protector becomes an air gap protector, the breakdown voltage of the protector increases to a higher value (e.g., approximately 700 volts) as illustrated by point 51. However, the higher value is still lower than the maximum allowable voltage permitted in many applications and is comparable to the protection provided by the carbon blocks such as currently used for backup protection. Of course, the actual breakdown values for a specific protector with either an ionizable gas or air gap will depend in part on spacing 46 and the condition, material and coating of portions 16 and 34. As mentioned, a spacing of three mils or less is expected to satisfy most applications.

The use of spacer 44 allows positive and very accurate control of spacing 46. When used in conjunction with a special coating on the discharge portions 16 and 34 of electrodes 6 and 4, respectively, this allows much smaller spacings to be used than have been used heretofore in gas tube protectors. The spacer 44 is located away from the discharge path and thus is not damaged by the discharges so that spacing 46 can be accurately maintained.

Electrodes 4 and 6 advantageously comprise copper, a copper coated base metal or similar structure. Control face portions 16 and 34 thereof advantageously include a thin coating 49 of carbon or graphite or similar material thereon which greatly decreases the pitting and eruption of portions 16 and 34 from discharges therebetween. This substantially improves the life of device 101. A coating of less than 0.1 mils thickness of a material commercially available under the trademark AQUADAG has been found acceptable for coatings 49. The effective life of device 101 when used as a gas tube protector having a normal gas filling therein as previously mentioned is also significantly better than the air gap version. However, the air gap version of device 101 utilizing the carbon coatings still has a substantially better average life than carbon blocks which would provide the same surge protection.

Because of the small size of spacing 46, repeated breakdowns between central face portions 16 and 34 may eventually result in a short circuiting metallic bridge being formed therebetween. This will necessitate replacement of the protector 101 whether it is being used as a gas tube protector or an air gap protector. However, the protector fails safe because of the shorting path. Accordingly, there is no need for backup or parallel protection as generally required for all existing gas tube protectors.

Because of the above discussed fail-safe feature, protector 101 can be utilized in the gas tube version as a direct replacement for carbon blocks in many applications. Although the initial cost of such a gas tube protector is more than the cost of carbon block protectors, the extended life as compared with carbon blocks which eliminates frequent service calls makes the gas tube protector 101 very attractive economically over an extended period. Conventional gas tube protectors require backup carbon block protection to provide the fail-safe feature.

Figure 3:
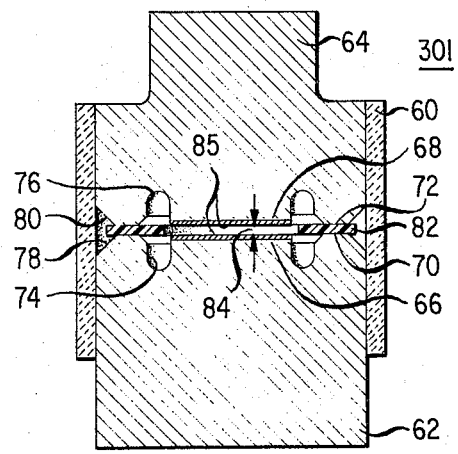
FIG. 3 is a cross-sectional view of a second embodiment of the invention.

A second and simplified embodiment of the invention which advantageously could be used in air gap protectors is shown in FIG. 3. In this embodiment a tubular housing 60 of ceramic, glass, plastic or like material has the ends thereof closed and sealed by respective electrodes 62 and 64. Electrodes 62 and 64, respectively, includes opposing central face portions 66 and 68 and outer face portions 70 and 72 separated from central face portions 66 and 68, respectively, by grooves 74 and 76. Outer face portions 70 and 72 include beveled faces 78 and 80. A spacer 82 between outer face portions 70 and 72 very accurately controls the spacing 84 of electrodes 62 and 64 as previously discussed so that such spacing can be made very small, e.g., less than 3 mils. Coatings 85 of carbon or the like are placed on central face portions 66 and 68 as previously discussed. Protector 301 operates similarly to protector 101 in providing fail-safe protection. Protector 301 is shown without a tubulation. It would have to be assembled in a controlled atmosphere such as a bell jar if it is intended for use as a gas tube protector.

Figure 4:
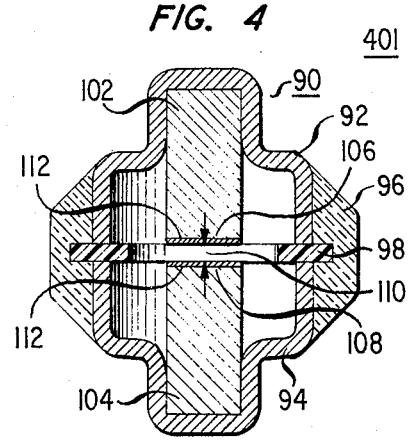
FIG. 4 is a cross-sectional view of another embodiment of the invention.

Still another embodiment of the invention is illustrated by device 401 of FIG. 4. Device 401 includes a metal shell 90 comprising two halves 92 and 94 having a tubular housing 96 of ceramic, glass or like material thereabout. The opposing ends of halves 92 and 94 are held in spaced relationship to each other by an insulative spacer 98 therebetween. Two electrodes 102 and 104 are rigidly attached to respective halves 92 and 94 with opposing ends 106 and 108 held in spaced relation to form a gap 110. The magnitude of gap 110 is positively and accurately controlled by spacer 98. Halves 92 and 94 are essentially extensions of electrodes 102 and 104, respectively. However, spacer 98 extends outward from both the inner and outer surfaces of halves 92 and 94 a sufficient distance to prevent any breakdown between the opposing ends of these halves. Rather, all discharges are confined to gap 110. Thus spacer 98 is not damaged by the discharges and can accurately maintain spacing 110 to values of 3 mils or less. Electrodes 102 and 104 advantageously include a coating 112 of carbon or the like on the opposing ends 106 and 108, respectively, thereof. Device 401 can be used as a gas tube protector if it is assembled in a controlled atmosphere or if a tubulation is added thereto for introducing a ionizable gas.

Although the foregoing embodiments of the invention have been discussed with respect to the use of annular spacers between annular outer or control electrode portions used for controlling the discharge gap, such a configuration is by no means essential. The only requirement is that the spacer and the control portions of the electrodes between which it is placed be configured so that there is no discharge between these portions across or around the spacer which might damage the spacer. That is, the breakdown or discharge path between these gap control portions of the electrodes must be substantially greater than the discharge path between the desired discharge portions of the electrodes.

Figure 5:
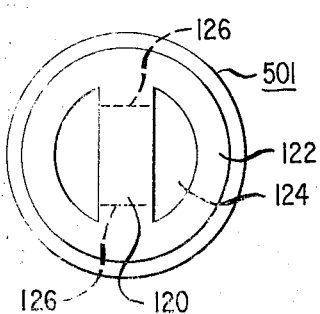
FIG. 5 is a view of the face of an electrode which can be utilized in the invention.

For example, FIG. 5 shows the face of an electrode 501 having a central or discharge portion 120 and an outer or control portion 122 separated from central portion 120 by semicircular depressions or voids 124. A second electrode similar to electrode 501 would be mounted in opposing relationship thereto but rotated 90° with respect to electrode 501. Thus when a spacer is mounted between opposing outer or control portions 122 and extending into depressions or voids 124, discharges are confined to that part of opposing central portions 120 between phantom lines 126. There likewise is no requirement that both opposing outer or control portions of the electrodes have beveled edges or that both electrodes have grooves separating the outer or control portion thereof from the central or discharge portion. As stated above the only requirement is that the discharge path between the control portions across the control spacer be substantially greater than the path between the desired discharge portions of the electrodes.

Various other modifications can be made to the protective device of this invention without departing from the spirit and scope of the following claims.

What is claimed is:

1. A surge protective device comprising a housing having first and second ends and a bore extending therethrough, a first electrode disposed in said first end of said housing and extending into said bore, and a second electrode disposed in said second end and extending into said bore in opposing spaced relation to said first electrode, CHARACTERIZED IN THAT:

each said first and second electrode includes a discharge portion and a control portion in opposed relation to said discharge portion and said control portion, respectively, of the other of said electrodes to form a gap between said discharge portions, said discharge portion and said control portion are coplanar, and at least one of said electrodes has a depression therein separating said discharge portion and said control portion thereof; and a spacer of insulative material is disposed between said control portions for controlling said gap, said spacer extends over said depression for increasing the distance between said control portions around said spacer to a magnitude substantially greater than the magnitude of said gap whereby discharges between said electrodes are confined to said discharge portions away from said control portions and said spacer.

2. Apparatus in accordance with claim 1 wherein at least one of said control portions includes beveled edges, said spacer extends outward from said beveled edges to increase said distance between said control portions.

3. Apparatus in accordance with claim 1 wherein said discharge portion comprises the center of said electrodes, said control portion comprises the outer part of said electrodes about said center, each said electrode includes one said depression separating respective said control portions and discharge portions, said control portions include beveled edges, and said spacer extends outward between said beveled edges for increasing said lengths of said discharge paths between said control portions.

4. A surge protective device comprising a housing having first and second ends and a bore extending therethrough, a first electrode disposed in said first end of said housing and extending into said bore, and a second electrode disposed in said second end and extending into said bore in opposing spaced relation to said first electrode, CHARACTERIZED IN THAT:

each said first and second electrode includes a discharge portion and a control portion in opposed relation to said discharge portion and said control portion, respectively, of the other of said electrodes to form a gap between said discharge portions, each said electrode includes two semicircular depressions therein separating said discharge portion and said control portion thereof, said depressions in one said electrode being rotated 90 degrees with respect to said depressions in the other said electrode; and a spacer of insulative material is disposed between said control portions for controlling said gap, said spacer extends over said depression for increasing the distance between said control portions around said spacer to a magnitude substantially greater than the magnitude of said gap whereby discharges between said electrodes are confined to said discharge portions away from said control portions and said spacer.

* * * * *